(12) United States Patent
Wakizaki

(10) Patent No.: US 10,154,114 B2
(45) Date of Patent: Dec. 11, 2018

(54) DELIVERY APPARATUS, DELIVERY METHOD, TERMINAL DEVICE, AND NON-TRANSITORY COMPUTER READABLE STORAGE MEDIUM

(71) Applicant: YAHOO JAPAN CORPORATION, Tokyo (JP)

(72) Inventor: Masatoshi Wakizaki, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 139 days.

(21) Appl. No.: 15/202,961

(22) Filed: Jul. 6, 2016

(65) Prior Publication Data

US 2017/0048351 A1    Feb. 16, 2017

(30) Foreign Application Priority Data

Aug. 13, 2015    (JP) ................. 2015-159851

(51) Int. Cl.
*H04L 29/08*    (2006.01)
*G06F 17/30*    (2006.01)

(52) U.S. Cl.
CPC ........ *H04L 67/32* (2013.01); *G06F 17/30867* (2013.01); *H04L 67/306* (2013.01)

(58) Field of Classification Search
CPC .................................................... H04L 67/32
See application file for complete search history.

(56) References Cited

U.S. PATENT DOCUMENTS

| 7,552,458 | B1* | 6/2009 | Finseth | G06Q 30/0225 705/14.26 |
|---|---|---|---|---|
| 2010/0287580 | A1* | 11/2010 | Harding | G06Q 30/0247 725/14 |
| 2012/0158490 | A1* | 6/2012 | Neumeyer | G06Q 30/0247 705/14.46 |
| 2014/0195340 | A1* | 7/2014 | Hotta | G06Q 30/0247 705/14.46 |
| 2014/0278939 | A1* | 9/2014 | Hotta | G06Q 30/0246 705/14.45 |
| 2014/0372207 | A1* | 12/2014 | Hotta | G06Q 30/0247 705/14.46 |

(Continued)

FOREIGN PATENT DOCUMENTS

| JP | 2002-189950 A | 7/2002 |
|---|---|---|
| JP | 2010-097494 A | 4/2010 |
| JP | 2015-079449 A | 4/2015 |

OTHER PUBLICATIONS

Nov. 17, 2015 Office Action issued in Japanese Patent Application No. 2015-159851.

*Primary Examiner* — Jerry B Dennison
(74) *Attorney, Agent, or Firm* — Oliff PLC

(57) ABSTRACT

A delivery apparatus according to the present application includes a receiving unit and a delivering unit. The receiving unit receives a delivery request for content from a terminal device. The delivering unit delivers the content corresponding to the delivery request, and user information that is related to a user who is using the terminal device and that is to be added to the content to the terminal device. For example, the delivering unit delivers the user information corresponding to an attribute that is selected from attributes related to the user, based on a correlation with the content, to the terminal device.

8 Claims, 11 Drawing Sheets

(56) References Cited

U.S. PATENT DOCUMENTS

| | | | | |
|---|---|---|---|---|
| 2014/0372212 A1* | 12/2014 | Hotta | ............... | G06Q 30/0251 |
| | | | | 705/14.49 |
| 2016/0307239 A1* | 10/2016 | Nakanishi | ............ | G06Q 30/0276 |
| 2016/0358207 A1* | 12/2016 | Montaque | ............ | G06Q 30/0245 |
| 2016/0358216 A1* | 12/2016 | Glover | ............ | G06F 17/3087 |
| 2017/0193549 A1* | 7/2017 | Mathur | ............ | G06Q 30/0252 |
| 2017/0221093 A1* | 8/2017 | Govil | ............ | G06Q 30/0244 |
| 2017/0287000 A1* | 10/2017 | Govil | ............ | G06Q 30/0251 |

* cited by examiner

| ADVER-TISEMENT ID | TEXT INFORMATION | ADVERTISER ID | PRODUCT | ... |
|---|---|---|---|---|
| AC11 | DON'T YOU WANT TO OWN A HOUSE IN XX? | AP11 | HOUSE | ... |
| AC12 | HARD-TO-GET BACK-ORDER GOURMET | AP12 | FOOD | ... |
| ... | ... | ... | ... | ... |

| USER ID | AGE | SEX | LOCATION OF RESIDENCE | INTEREST | ... |
|---|---|---|---|---|---|
| U1 | 30s | MALE | AREA A | SPORTS | ... |
| U2 | 40s | FEMALE | AREA B | GOURMET | ... |
| ... | ... | ... | ... | ... | ... |

FIG.5

| IMAGE ID | IMAGE | ... |
|---|---|---|
| G11 | | ... |
| G12 | | ... |
| ... | ... | ... |

123

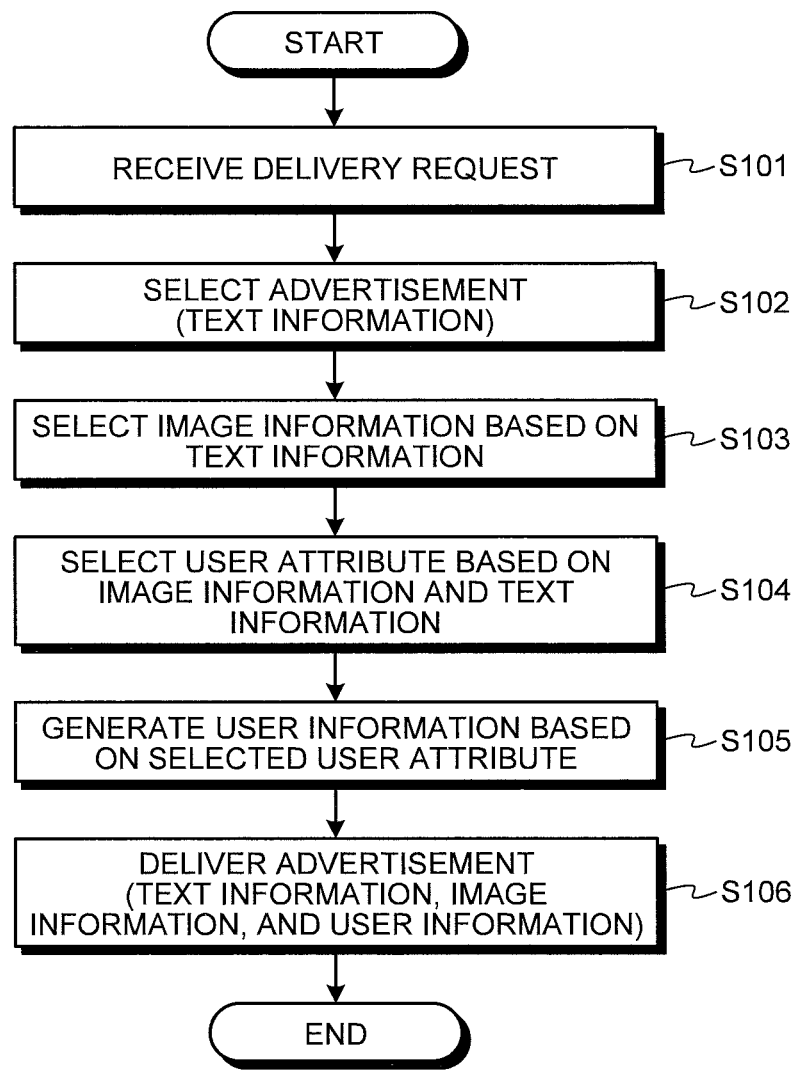

FIG.8

```
START
  ↓
RECEIVE ADVERTISEMENT
(TEXT INFORMATION, IMAGE INFORMATION, AND USER   ～S201
INFORMATION)
  ↓
SUPERIMPOSE USER INFORMATION OVER IMAGE          ～S202
INFORMATION
  ↓
PRESENT IMAGE INFORMATION WITH USER
INFORMATION SUPERIMPOSED, AND TEXT               ～S203
INFORMATION IN PREDETERMINED LAYOUT
  ↓
END
```

| ADVER-TISEMENT ID | TEXT INFORMATION | ADVER-TISER ID | PROD-UCT | PRIORITY | | | ... | |
| --- | --- | --- | --- | --- | --- | --- | --- | --- |
| | | | | FIRST | SECOND | THIRD | ... | ... |
| AC11 | DON'T YOU WANT TO OWN A HOUSE IN XX? | AP11 | HOUSE | AGE (30s) | SEX (MALE) | INCOME (Y0,000 YEN OR HIGHER) | ... | ... |
| AC12 | HARD-TO-GET BACK-ORDER GOURMET | AP12 | FOOD | INTEREST (GOURMET) | FAMILY CONFIGURA-TION (MARRIED) | AGE (20s) | ... | ... |
| ... | ... | ... | ... | ... | ... | ... | ... | ... |

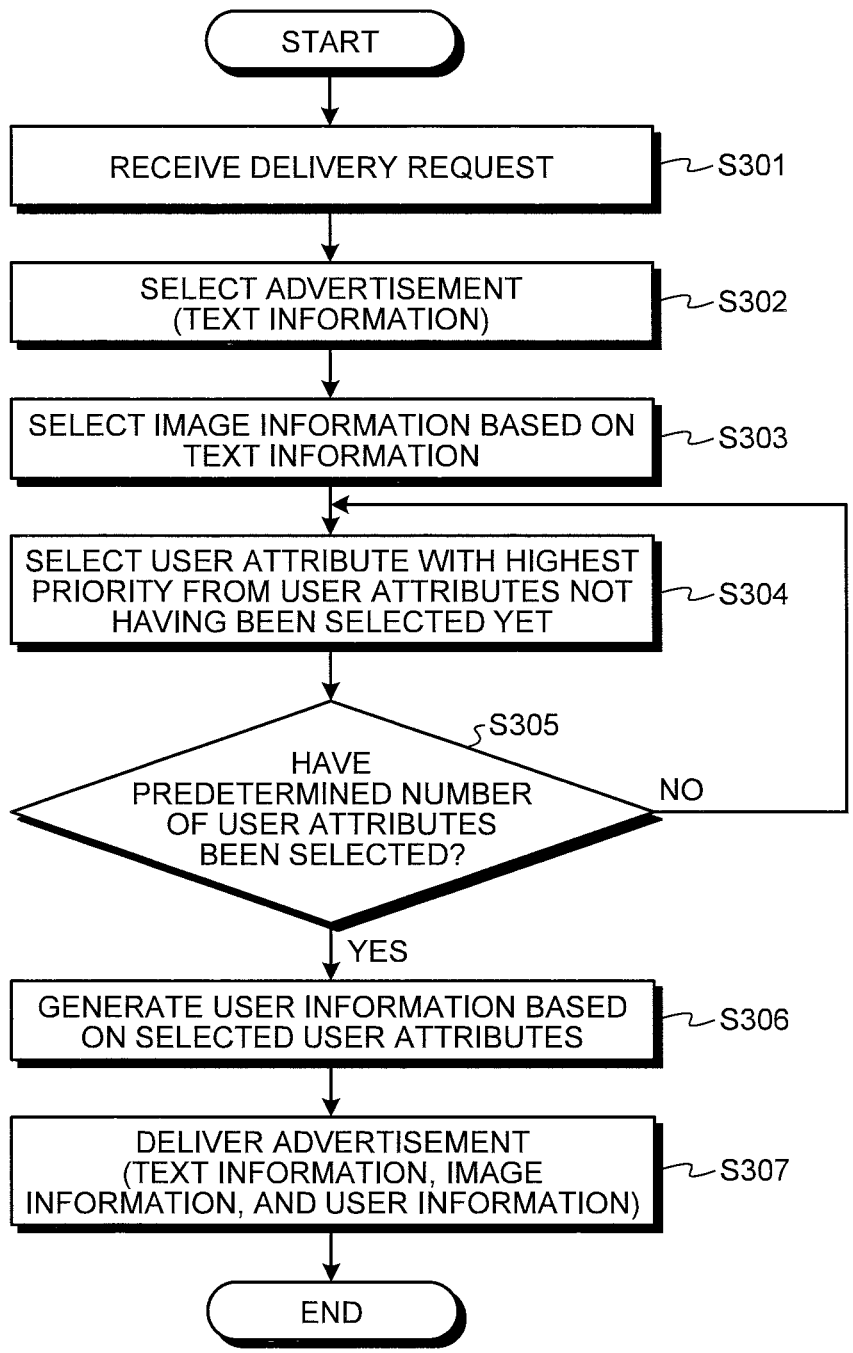

DELIVERY APPARATUS, DELIVERY METHOD, TERMINAL DEVICE, AND NON-TRANSITORY COMPUTER READABLE STORAGE MEDIUM

CROSS-REFERENCE TO RELATED APPLICATION(S)

The present application claims priority to and incorporates by reference the entire contents of Japanese Patent Application No. 2015-159851 filed in Japan on Aug. 13, 2015.

BACKGROUND OF THE INVENTION

1. Field of the Invention

The present invention relates to a delivery apparatus, a delivery method, a terminal device, and a non-transitory computer readable storage medium.

2. Description of the Related Art

Technologies for delivering different pieces of content depending on users have recently been disclosed. For example, a technique for creating an advertising creative based on one of a plurality of templates has been provided.

Such a conventional technology is, however, not quite capable of delivering content suitable for a user. The reason why the technology is not quite capable of delivering suitable content is that it is not always possible to prepare a template that is suitable for every user.

SUMMARY OF THE INVENTION

It is an object of the present invention to at least partially solve the problems in the conventional technology.

According to one aspect of an embodiment, a delivery apparatus includes a receiving unit that receives a delivery request for content from a terminal device, and a delivering unit that delivers the content corresponding to the delivery request, and user information that is related to a user who is using the terminal device and that is to be added to the content to the terminal device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a schematic illustrating an example of an advertisement information storage unit according to the embodiment;

FIG. 4 is a schematic illustrating an example of a user attribute information storage unit according to the embodiment;

FIG. 5 is a schematic illustrating an example of an image information storage unit according to the embodiment;

FIG. 7 is a flowchart illustrating an example of the delivery process according to the embodiment;

FIG. 8 is a flowchart illustrating an example of a presenting process in the terminal device according to the embodiment;

FIG. 9 is a schematic illustrating an example of an advertisement information storage unit according to a modification of the embodiment;

FIG. 10 is a flowchart illustrating an example of delivery process according to a modification;

DETAILED DESCRIPTION OF THE PREFERRED EMBODIMENTS

Figure 1:
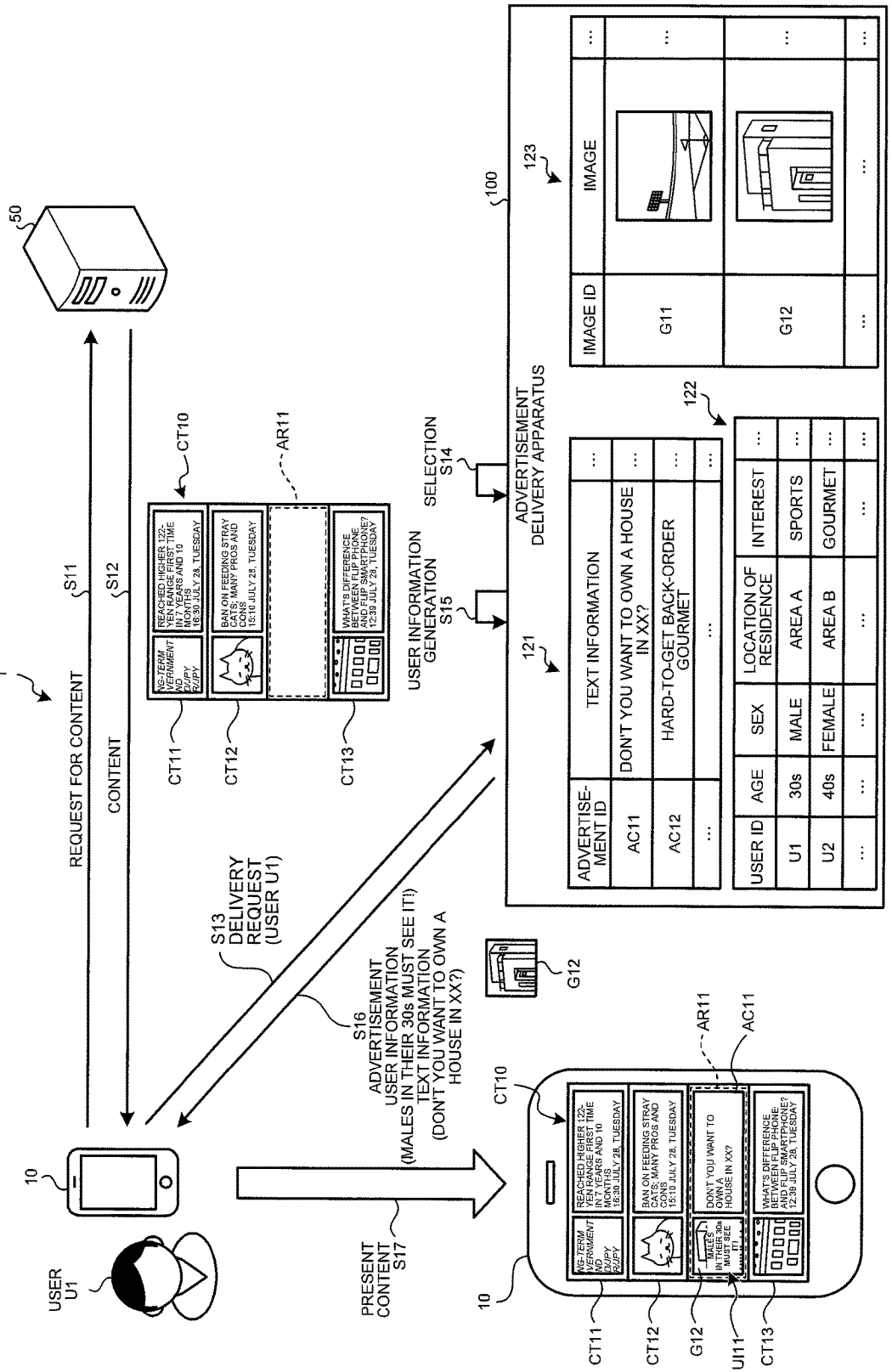
FIG. 1 is a schematic illustrating an example of a delivery process according to an embodiment of the present invention.

Embodiments implementing a delivery apparatus, a delivery method, a delivery program, a terminal device, and a presenting program according to the present invention (hereinafter, referred to as "embodiments") will now be explained in detail with reference to some drawings. The embodiments are, however, not intended to limit the scope of the delivery apparatus, the delivery method, the delivery program, the terminal device, and the presenting program according to the present invention in any way. Portions that are the same among the embodiments described below are assigned with the same reference numerals, and redundant explanations thereof are omitted herein.

Embodiments

1. Delivery Process

To begin with, an example of a delivery process according to an embodiment will now be explained with reference to FIG. 1. FIG. 1 is a schematic illustrating an example of a delivery process according to the present embodiment. An advertisement delivery apparatus 100 illustrated in FIG. 1 provides a delivery service for delivering an advertisement that is to be presented in content delivered by a content delivery apparatus 50. Explained now is an example in which the content delivered by the content delivery apparatus 50 is a web page.

As illustrated in FIG. 1, a delivery system 1 includes a terminal device 10, the content delivery apparatus 50, and the advertisement delivery apparatus 100. The terminal device 10, the content delivery apparatus 50, and the advertisement delivery apparatus 100 are connected communicatively over a given communication network not illustrated, over the wire or wirelessly. Each of the terminal device 10, the content delivery apparatus 50, and the advertisement delivery apparatus 100 included in the delivery system 1 illustrated in FIG. 1 may be provided in plurality.

The terminal device 10 is an information processing apparatus that is used by a user. The terminal device 10 may be a smartphone, a tablet terminal, a laptop personal computer (PC), a desktop PC, a mobile phone, or a personal digital assistant (PDA), as an example. In the example illustrated FIG. 1, the terminal device 10 is a smartphone.

The terminal device 10 receives operations performed by a user. In the example illustrated in FIG. 1, the terminal device 10 starts a predetermined browser application (hereinafter, sometimes simply referred to as a "browser"). The terminal device 10 then requests the content to be presented by the browser, from the content delivery apparatus 50. The terminal device 10 also requests, if the content to be presented includes a section for presenting an advertisement, the advertisement from the advertisement delivery apparatus 100. Without limitation to a browser, the terminal device 10 may also use any other application for presenting the content delivered by the content delivery apparatus 50. Hereinafter, the terminal device 10 is sometimes referred to as a user. In other words, in the explanation hereunder, the term "user" may be exchanged with the term "terminal device 10".

The advertisement delivery apparatus 100 is a delivery apparatus for providing an advertisement delivery service for delivering advertisements in response to advertisement delivery requests. For example, the advertisement delivery apparatus 100 is a delivery apparatus for delivering a different advertisement to the terminal device 10 depending on the user who is using the terminal device 10 having requested the delivery of the advertisement. When the advertisement to be delivered to the terminal device 10 includes only text information and no image, the advertisement delivery apparatus 100 selects image information suitable for the advertisement. The advertisement delivery apparatus 100 also generates user information to be added to the text information or the image information that is an advertisement, based on an attribute of the user who is using the terminal device 10. Hereinafter, the text information and the image information that are an advertisement, as well as the user information added to the advertisement, are sometimes collectively referred to as an advertisement. The user information herein is information that includes an attribute of the user, such as the age or the sex, and that can be expected to improve the appealing effect of the advertisement to the user. The user information may include any information as long as the information represents a user attribute, and may include more private attributes such as the name or the area of residence, without limitation to the age or the sex. It is also assumed herein that, in the example illustrated in FIG. 1, a permission for processing of the image information, that is a permission for secondarily processing the image information, has already been acquired from the third party who has the right (e.g., copyright) to the image information.

The content delivery apparatus 50 is an information processing apparatus that delivers content. In the example illustrated in FIG. 1, the content delivery apparatus 50 delivers content that is a web page to be presented by the browser, which has been started on the terminal device 10, in response to a request for the content received from the terminal device 10.

An example of the delivery process will now be explained with reference to FIG. 1. FIG. 1 assumes that a user is the user identified by a user ID "U1" (hereinafter, sometimes referred to as "user U1"). In the example in FIG. 1, it is assumed that the advertisements stored in an advertisement information storage unit 121 consist only of text information. In other words, the content submitted by the advertiser only consists of text information.

As illustrated in FIG. 1, the terminal device 10, on which the browser has been started by the operation of the user U1, transmits a request for content to the content delivery apparatus 50 (Step S11). For example, the terminal device 10 is caused to request a delivery of content from the content delivery apparatus 50, in response to the user U1 entering the uniform resource locator (URL) of the content delivery apparatus 50 to the address bar of the browser, for example, although such an operation is not illustrated in FIG. 1.

The content delivery apparatus 50 having received the request for the content from the terminal device 10 delivers the content to the terminal device 10 (Step S12). For example, the content delivery apparatus 50 delivers content CT10 including pieces of content CT11, CT12, and CT13, and an advertisement presenting section AR11 to the terminal device 10.

The terminal device 10 having received the content CT10 then transmits a delivery request for an advertisement to the advertisement delivery apparatus 100, because the content CT10 includes the advertisement presenting section AR11 (Step S13). At Step S13, the terminal device 10 transmits the information identifying the user U1 who is using the terminal device 10 to the advertisement delivery apparatus 100, as a delivery request.

The advertisement delivery apparatus 100 having acquired the delivery request for an advertisement from the terminal device 10 selects the advertisement to be delivered to the terminal device 10 (Step S14). Specifically, the advertisement delivery apparatus 100 selects text information that is a text of the advertisement from the advertisement information storage unit 121. For example, the advertisement delivery apparatus 100 selects the text information from the advertisement information storage unit 121 based on the information related to a user attribute stored in a user attribute information storage unit 122. For example, the advertisement delivery apparatus 100 selects the text information "Don't you want to own a house in XX?" that is identified by an advertisement ID "AC11" (hereinafter, sometimes referred to as "text information AC11"), as an advertisement to be delivered to the terminal device 10.

The advertisement delivery apparatus 100 then selects image information (hereinafter, sometimes simply referred to as an "image") to be presented together with the text information from an image information storage unit 123, based on the selected text information. For example, because the text information "Don't you want to own a house in XX?" is a text of the advertisement related to a house, the advertisement delivery apparatus 100 selects an image related to a house. Specifically, the advertisement delivery apparatus 100 selects the image identified by the image ID "G12" (hereinafter, sometimes referred to as "image G12") from the image information storage unit 123, based on the text information "Don't you want to own a house in XX?".

The advertisement delivery apparatus 100 also selects the attribute that is to be used in generating the user information from the user attribute information storage unit 122. For example, the advertisement delivery apparatus 100 selects the attribute to be used in generating user information based on the image G12 and the text information AC11 making up the advertisement. For example, the advertisement delivery apparatus 100 selects an attribute among the attributes related to the user, based on the correlation between the attribute and the image G12 or the text information AC11. Specifically, the advertisement delivery apparatus 100 selects the attribute "age" and the attribute "sex" that are highly correlated with a house, based on the image G12 of a house or on the text information AC11 for recommending the purchase of a house. Alternatively, the advertisement delivery apparatus 100 may use a distribution of the attributes among the users who have purchased the product or used the service which is the subject of the advertisement to determine the correlation between the user attribute and the subject of the advertisement.

The advertisement delivery apparatus 100 then generates user information related to the user U1 who is using the terminal device 10 based on the attribute selected at Step S14 (Step S15). For example, the advertisement delivery apparatus 100 generates user information related to the user U1 based on the information related to the attributes such as the age "30s" and the sex "male" of the user U1. Specifically, the advertisement delivery apparatus 100 generates user information, "Males in their 30s must see it!" (hereinafter, sometimes referred to as "user information UI11"), using the age "30s" and the sex "male".

The advertisement delivery apparatus 100 then delivers the advertisement to the terminal device 10 (Step S16). Specifically, the advertisement delivery apparatus 100 delivers the text information AC11, the image G12, and the user information UI11, as an advertisement, to the terminal device 10.

The terminal device 10 then places the advertisement received from the advertisement delivery apparatus 100 in the advertisement presenting section AR11 included in the content CT10 having been received from the content delivery apparatus 50, and presents the content CT10 (Step S17). In the example illustrated in FIG. 1, the terminal device 10 presents the advertisement in which the image is positioned on the left-hand side and the text information is positioned on the right-hand side in the advertisement presenting section AR11, in the same manner as the way in which the pieces of content CT11 to CT13 are presented. Specifically, the terminal device 10 places "Don't you want to own a house in XX?", which is the text information AC11, on the right-hand side of the advertisement presenting section AR11.

The terminal device 10 places the image G12 of a house on the left-hand side of the advertisement presenting section AR11. At this time, the terminal device 10 presents the user information UI11 in a manner superimposed over the image G12 of a house, which is positioned on the left-hand side of the advertisement presenting section AR11. Specifically, the terminal device 10 breaks up the user information UI11 into three lines of "Males", "in their 30s", and "must see it!", and presents the user information UI11 in a manner superimposed over the image G12 of a house. Although described above is an example in which the advertisement delivery apparatus 100 delivers the text information AC11, the image G12, and the user information UI11 to the terminal device 10 at Step S16, the advertisement delivery apparatus 100 may also generate a synthesized image that is the synthesis of the image G12 and the user information UI11, and deliver the synthesized image to the terminal device 10. In such a case, the advertisement delivery apparatus 100 may generate a synthesized image in which the user information UI11 is superimposed over the image G12 of a house, and then deliver the synthesized image to the terminal device 10. Specifically, the advertisement delivery apparatus 100 may generate a synthesized image in which the user information UI11 having been broken up into the three lines of "Males", "in their 30s", and "must see it!" is superimposed over the image G12 of a house, and then deliver the synthesized image to the terminal device 10.

As described above, the advertisement delivery apparatus 100 delivers the user information to be added to the text information and the image that are advertisement to the terminal device 10. The terminal device 10 having received the user information presents the user information in a manner superimposed over the image. In this manner, because the advertisement presented by the terminal device 10 is an advertisement added with the user information, which has been generated based on the attribute of the user him/herself, the chances of the content attracting the attention of the user who is using the terminal can be increased. In other words, the advertisement delivery apparatus 100 can achieve a selective attention, that is, what is called a cocktail party effect, in the human behavioral psychology, in the delivery of content such as an advertisement. In this manner, the advertisement delivery apparatus 100 is enabled to deliver advertisements suitable for each user. In other words, the advertisement delivery apparatus 100 can deliver suitable content depending on users.

If the image selected at Step S14 is an image that is not suitable for having the user information superimposed, the advertisement delivery apparatus 100 does not need to superimpose the user information over the image. In such a case, the advertisement delivery apparatus 100 may present the user information near the image, for example, in the manner described later. If the advertisement information storage unit 121 has some image submitted by the advertiser, the advertisement delivery apparatus 100 may also present the user information in a manner superimposed over the image submitted by the advertiser. In such a case, the advertisement delivery apparatus 100 may receive a designation as to whether the advertiser has given a permission to add the user information to the image, for example. For the image information provided by advertisers, it is assumed that, as mentioned earlier, a permission for processing of the image information, that is, a permission for secondarily processing the image information, has already been acquired from the third party who has the right (e.g., copyright) to the image information.

Although described above is an example in which the user information is to be superimposed over the image, the user information may be added to the advertisement that is the content in any way, as long as the user information is provided to the user together with the advertisement. As an example, the advertisement delivery apparatus 100 may add the user information to the advertisement by placing the user information near (e.g., below) the image. As another example, the advertisement delivery apparatus 100 may add the user information to the advertisement by placing the user information near (e.g., below) the text information. The advertisement delivery apparatus 100 may also cause the terminal device 10 to output the user information as an audio when the advertisement is presented on the terminal device 10. Furthermore, the advertisement delivery apparatus 100 may also change the color in which the user information is presented depending on the text information or on the image to which the user information is added so that the visibility of the user information is improved. The advertisement delivery apparatus 100 may also change the color in which the text information or the image is displayed, depending on the text information or the image to which the user information is added so that the visibility of the user information is improved.

Furthermore, although described above is an example in which the user information UI11 is presented in three lines of "Males", "in their 30s", and "must see it!", the terminal device 10 may change how the user information is presented depending on its purpose. The terminal device 10 may, for example, change the size of the characters, the number of lines, or the number of characters fitted in one line as appropriate, in a manner suitable for the section in which the user information is presented, e.g., depending on the size of the image over which the user information is superimposed.

The advertisement delivery apparatus 100 may update the user attribute information based on whether the user has made an operation on the advertisement added with the user information. Specifically, the advertisement delivery apparatus 100 may update the user attribute information stored in the user attribute information storage unit 122 based on whether the user has made an operation on the advertisement added with the user information. In such a case, the advertisement delivery apparatus 100 may deliver a plurality of advertisements added with user information including "20s", user information including "30s", and so on, respectively, one after another, to the terminal device 10 owned by a user whose age that is an attribute is unknown. If the user selects (clicks on) the advertisement added with the user information including "20s", the advertisement delivery apparatus 100 may then update the user attribute information stored in the user attribute information storage unit 122, under an assumption that the user is in his/her "20s".

In the manner described above, the advertisement delivery apparatus 100 can assume an unknown attribute of a user by outputting a plurality of advertisements added with different pieces of user information that is related to the unknown attribute of the user, and comparing the user responses to the respective advertisements. In other words, even for a user whose attributes are all unknown, the advertisement delivery apparatus 100 may identify a user attribute by outputting a plurality of advertisements added with different pieces of user information that is related to an unknown attribute, and by comparing the user responses to the respective advertisement. In the manner described above, the advertisement delivery apparatus 100 can collect information related to a user attribute by outputting a plurality of advertisements added with different piece of user information that is related to the unknown attribute. By updating the user attribute information stored in the user attribute information storage unit 122, the advertisement delivery apparatus 100 can deliver advertisements suitable for the user.

2. Configuration of Advertisement Distributing Apparatus

Figure 2:
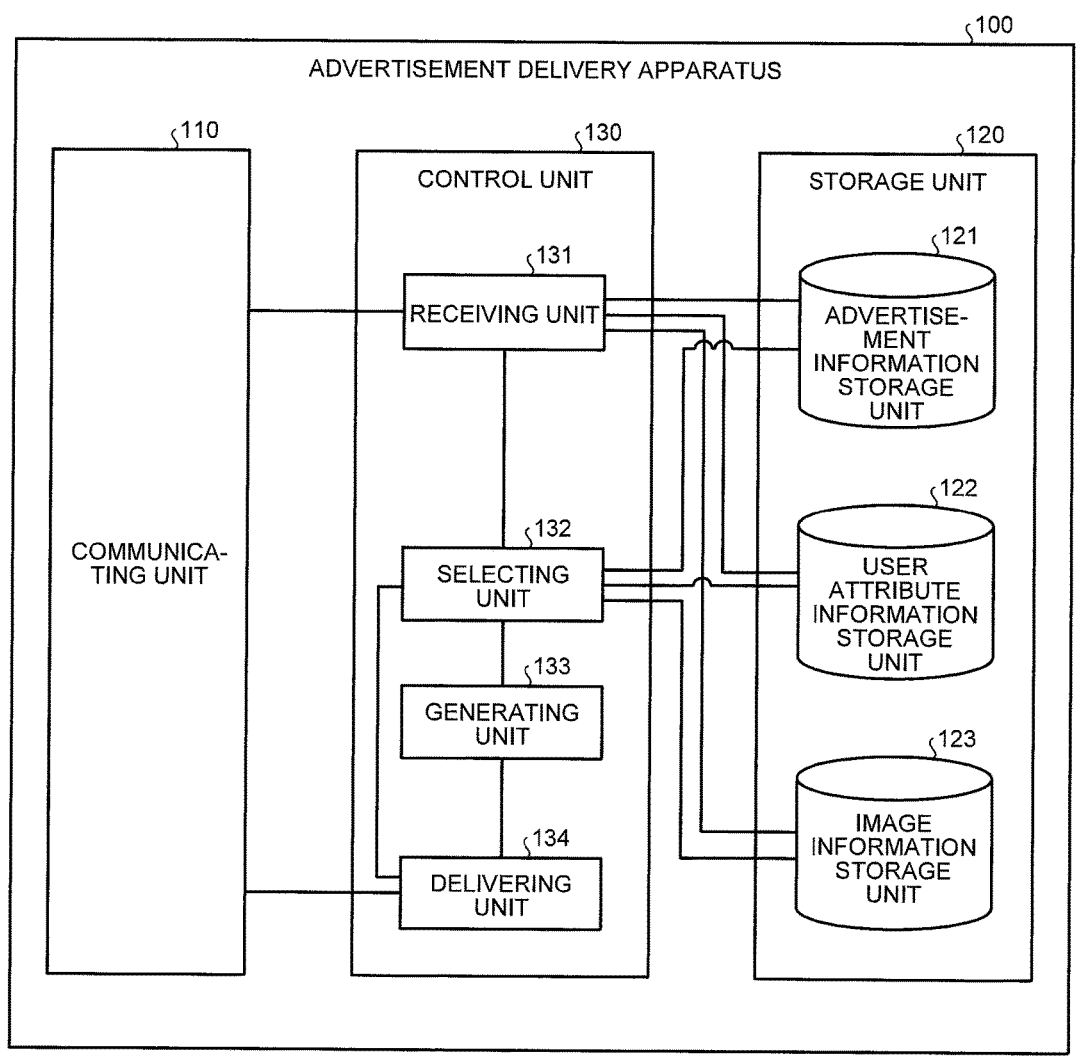
FIG. 2 is a schematic illustrating an exemplary configuration of an advertisement delivery apparatus according to the embodiment.

A configuration of the advertisement delivery apparatus 100 according to the present embodiment will now be explained with reference to FIG. 2. FIG. 2 is a schematic illustrating an exemplary configuration of the advertisement delivery apparatus 100 according to the present embodiment. As illustrated in FIG. 2, the advertisement delivery apparatus 100 includes a communicating unit 110, a storage unit 120, and a control unit 130. The advertisement delivery apparatus 100 may also include an input unit (such as a keyboard or a mouse) for receiving various operations from an administrator or the like of the advertisement delivery apparatus 100, or a display unit (such as a liquid display) for displaying various types of information.

The communicating unit 110 is implemented as a network interface card (NIC), for example. The communicating unit 110 is connected to a network over the wire or wirelessly, and exchanges information with the terminal device 10.

Storage Unit 120

The storage unit 120 is implemented as a storage device such as a random access memory (RAM), a semiconductor memory device such as a flash memory, a hard disk, or an optical disk, for example. The storage unit 120 according to the present embodiment includes the advertisement information storage unit 121, the user attribute information storage unit 122, and the image information storage unit 123, as illustrated in FIG. 2.

Advertisement Information Storage Unit 121

The advertisement information storage unit 121 according to the present embodiment stores therein various types of information related to advertisements. FIG. 3 illustrates an example of the advertisement information storage unit 121 according to the present embodiment. The advertisement information storage unit 121 illustrated in FIG. 3 includes items such as "advertisement ID", "text information", "advertiser ID", and "product".

The "advertisement ID" represents identification information for identifying an advertisement. The "text information" represents text information that is the text of the advertisement submitted by the advertiser. The "advertiser ID" represents the identification information for identifying the advertiser. Advertisers sometimes delegate their tasks such as submission of advertisements to an agency. In the explanation hereunder, therefore, the term "advertiser" represents a concept including agencies, as well as advertisers. The "product" represents a classification of the product or the service to be advertised. As information for identifying a product, the advertisement information storage unit 121 may store therein information such as "product ID" for identifying the product, without limitation to a classification of the product.

For example, the example illustrated in FIG. 3 represents that the text information "Don't you want to own a house in XX?" identified by the advertisement ID "AC11" is an advertisement acquired from the advertiser identified by the advertiser ID "AP11", and the classification of the product to be advertised by the advertisement is a "house".

The advertisement information storage unit 121 may store therein various types of information suitable for the purpose, without limitation to those described above. For example, the advertisement information storage unit 121 may store therein information related to a bidding price, for example. The advertisement information storage unit 121 may also store therein the image information submitted by the advertiser.

User Attribute Information Storage Unit 122

The user attribute information storage unit 122 according to the present embodiment stores therein various types of information related to the content. FIG. 4 illustrates an example of the user attribute information storage unit 122 according to the present embodiment. The user attribute information storage unit 122 illustrated in FIG. 4 includes items such as "user ID", "age", "sex", "location of residence", and "interest".

The "user ID" represents identification information for identifying a user. For example, the user identified by the user ID "U1" corresponds to the user described in the example illustrated in FIG. 1. The "age" represents the age of the user identified by the user ID. The "age" may represent a specific age, e.g., 35 years old, of the user identified by the user ID. The "sex" represents the sex of the user identified by the user ID. The "location of residence" represents the area where the user identified by the user ID resides. The "location of residence" may be a specific address of the user identified by the user ID. The "interest" represents a subject in which the user identified by the user ID is interested. The "interest" may be registered in plurality.

For example, the example illustrated in FIG. 4 represents that the age of the user identified by the user ID "U1" is in his "30s", and the sex is "male". The example illustrated in FIG. 4 also represents that the location of residence of the user identified by the user ID "U1" is "area A", and the subject of interest is "sports".

The user attribute information storage unit 122 may also store therein various types of information suitable for the purpose, e.g., demographic attribute information or psychographic attribute information, without limitation to the examples explained above. As another example, the user attribute information storage unit 122 may store therein information such as name, family configuration, income, and place of work.

Image Information Storage Unit 123

Figure 5:
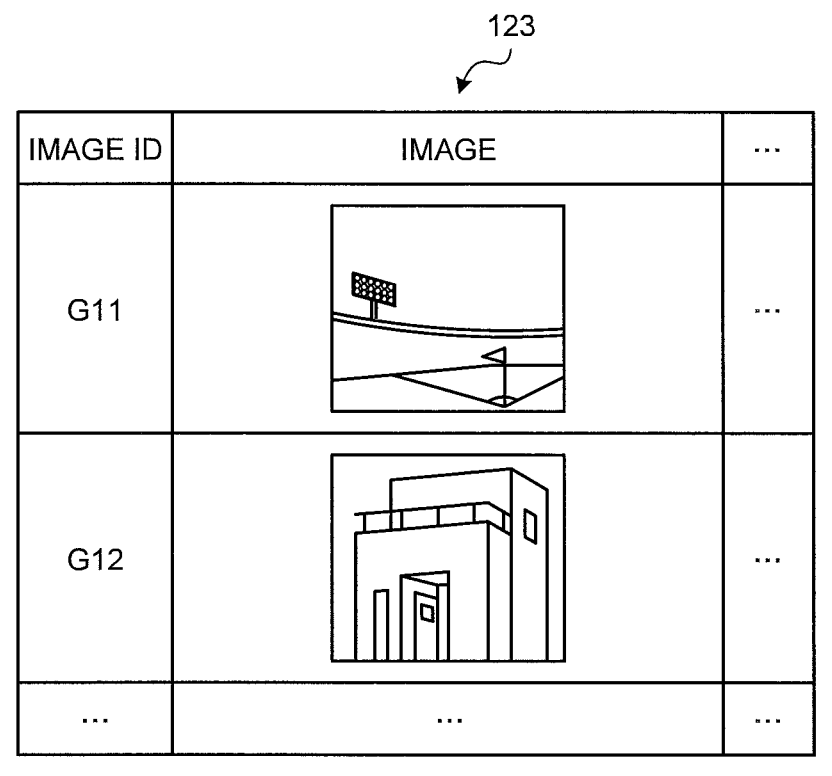

The image information storage unit 123 according to the present embodiment stores therein various types of information related to the images that are content. FIG. 5 illustrates an example of the image information storage unit 123 according to the present embodiment. The image information storage unit 123 illustrated in FIG. 5 include items such as "image ID" and "image".

The "image ID" represents identification information for identifying an image. For example, the image identified by the image ID "G12" corresponds to the image G12 described in the example illustrated in FIG. 1. The "image" represents the image data identified by the image ID. In FIG. 5, image data is depicted as an image identified by an image ID, for the purpose of explanation, but the "image" may store therein not only the image data but also a file path name indicating the location where the image data is stored.

For example, the example illustrated in FIG. 5 represents that the image identified by the image ID "G11" is a landscape image with a stadium. The image information storage unit 123 may store therein various types of information suitable for the purpose, without limitation to that described above. For example, the image information storage unit 123 may store therein information related to the source of the image identified by the image ID "G11". For the images in the image information storage unit 123, it is assumed that a determination (check) have been made as to whether a permission for processing of the image, that is, a permission for secondarily processing the image has already been acquired from the source of the image or the third party who has the right (e.g., copyrights) related to the image, and the permission status is managed (stored).

Control Unit 130

Returning to the description of FIG. 2, the control unit 130 is implemented by causing a central processing unit (CPU), a micro-processing unit (MPU), or the like to execute various computer programs (corresponding to an example of a delivery program) stored in a storage device that is internal to the advertisement delivery apparatus 100, for example, using a RAM as a working area. The control unit 130 may also be implemented as an integrated circuit such as an application specific integrated circuit (ASIC) or a field programmable gate array (FPGA).

As illustrated in FIG. 2, the control unit 130 includes a receiving unit 131, a selecting unit 132, a generating unit 133, and a delivering unit 134, and implements or executes the functions or the actions of the information process explained below. The internal configuration of the control unit 130 is not limited to that illustrated in FIG. 2, and may have any other configuration as long as the configuration is enabled to perform the information process explained below. The processing units provided to the control unit 130 may be connected in any way, without limitation to the connection illustrated in FIG. 2.

Receiving Unit 131

The receiving unit 131 receives delivery requests for content from the terminal device 10. For example, the receiving unit 131 receives delivery requests for advertisements that are content from the terminal device 10. The receiving unit 131 may also receive information related to the section in which the content is presented, as a delivery request, from the terminal device 10. For example, the receiving unit 131 may receive information related to the size of the section in which the image in the content is presented from the terminal device 10, as a delivery request.

The receiving unit 131 may also receive submission of advertisements from advertisers. The receiving unit 131 may receive submission of advertisements from agencies requested to submit the advertisement by advertisers. In such a case, the receiving unit 131 receives the submission of an advertisement from an information processing apparatus used by the advertiser or the agency, for example. The receiving unit 131 stores therein the advertisement the submission of which has been received, in the advertisement information storage unit 121, for example.

The receiving unit 131 also receives information related to the attributes of the user who is using the terminal device 10 from the terminal device 10 or a predetermined external apparatus. When such information is received, the receiving unit 131 stores the received information related to the user attributes in the user attribute information storage unit 122, for example. The receiving unit 131 also receives images provided from predetermined sources. To receive such an image, for example, the receiving unit 131 receives the provided image from an information processing apparatus used by a predetermined source. The receiving unit 131 also stores the provided and received image in the image information storage unit 123, for example.

Selecting Unit 132

The selecting unit 132 selects the advertisement to be delivered to the terminal device 10. For example, the selecting unit 132 selects the text information that is the text of an advertisement from the advertisement information storage unit 121. Specifically, the selecting unit 132 selects the text information from the advertisement information storage unit 121 based on the information related to the user attribute stored in the user attribute information storage unit 122. In the example illustrated in FIG. 1, the selecting unit 132 selects "Don't you want to own a house in XX?" that is the text information AC11, as an advertisement to be delivered to the terminal device 10.

The selecting unit 132 also selects an image to be presented with the text information from the image information storage unit 123, based on the selected text information. In the example illustrated in FIG. 1, the selecting unit 132 selects an image related to a house because the text information "Don't you want to own a house in XX?" is a text of an advertisement related to a house. Specifically, the selecting unit 132 selects the image G12 that is an image of a house from the image information storage unit 123, based on the text information "Don't you want to own a house in XX?".

The selecting unit 132 selects an attribute from the attributes related to the user, based on a correlation between the attribute and the content. The selecting unit 132 selects the attribute to be used in generating user information, for example, from the user attribute information storage unit 122. In the example illustrated in FIG. 1, the selecting unit 132 selects the attribute to be used in generating user information based on the image G12 and the text information AC11 that are an advertisement (content). Specifically, the selecting unit 132 selects the attribute "age" and the attribute "sex" that are highly correlated with a house, based on the image G12 of a house, and based on the text information AC11 recommending the purchase of a house. The selecting unit 132 may also select an attribute used in generating the user information from the user-related attributes, based on the priorities assigned to the respective attributes. This point will be described later in detail.

Generating Unit 133

The generating unit 133 generates the user information based on the attribute selected by the selecting unit 132. In the example illustrated in FIG. 1, the generating unit 133 generates the user information related to the user U1, based on the information related to the attributes such as the age "30s" and the sex "male" of the user U1. Specifically, the generating unit 133 generates "Males in their 30s must see it!" that is the user information UI11 using the age "30s" and the sex "male". The generating unit 133 may also generate control information instructing how the user information is to be presented. For example, the generating unit 133 may generate control information designating the position at which the user information is to be presented with respect to the image. For example, the generating unit 133 may generate control information for presenting the user information in a manner superimposed over the image. The generating unit 133 may also generate control information for presenting the user information UI11 in a manner broken down into three lines including "Males", "in their 30s", and "must see it!".

Delivering Unit 134

The delivering unit 134 delivers the content corresponding to a delivery request, and the user information that is related to the user who is using the terminal device 10 and that is to be added to the content to the terminal device 10. For example, the delivering unit 134 delivers an advertisement corresponding to a delivery request, and user information that is related to the user who is using the terminal device 10 and that is to be added to the advertisement to the terminal device 10. The delivering unit 134 also delivers control information instructing how the user information generated by the generating unit 133 is to be presented, to the terminal device 10.

The delivering unit 134 also delivers content including image information, and user information that is text information to be presented in a manner superimposed over the image information, to the terminal device 10. The delivering unit 134 delivers, for example, an advertisement including image information and user information that is to be presented in a manner superimposed over the image information, to the terminal device 10. In the example illustrated in FIG. 1, the delivering unit 134 delivers an advertisement to the terminal device 10. Specifically, the delivering unit 134 delivers the text information AC11, the image G12, and the user information UI11, as an advertisement, to the terminal device 10.

The delivering unit 134 delivers the content including the image information over which the user information is to be superimposed, and the information to be presented in the section where no such user information is to be added, to the terminal device 10. In the example illustrated in FIG. 1, the delivering unit 134 delivers the advertisement including the image G12 over which the user information UI11 is to be superimposed, and the text information AC11 to be presented in the section where no user information UI11 is to be added, to the terminal device 10. The delivering unit 134 delivers the content to the terminal device 10 that presents the content including the image information with the user information superimposed as a list together with another piece of content. In the example illustrated in FIG. 1, the delivering unit 134 delivers the advertisement including the image G12 over which the user information UI11 is to be superimposed to the terminal device 10 that presents the advertisement as a list together with other pieces of content CT11 to CT13.

For example, the delivering unit 134 delivers the user information corresponding to the attribute having been selected from the user-related attributes, having been selected based on the correlation between the attribute and the content, to the terminal device 10. As another example, the delivering unit 134 delivers the user information corresponding to the attribute having been selected from the user-related attributes, having been selected based on the priorities that are assigned to the respective attributes, to the terminal device 10.

3. Configuration of Terminal Device

Figure 6:
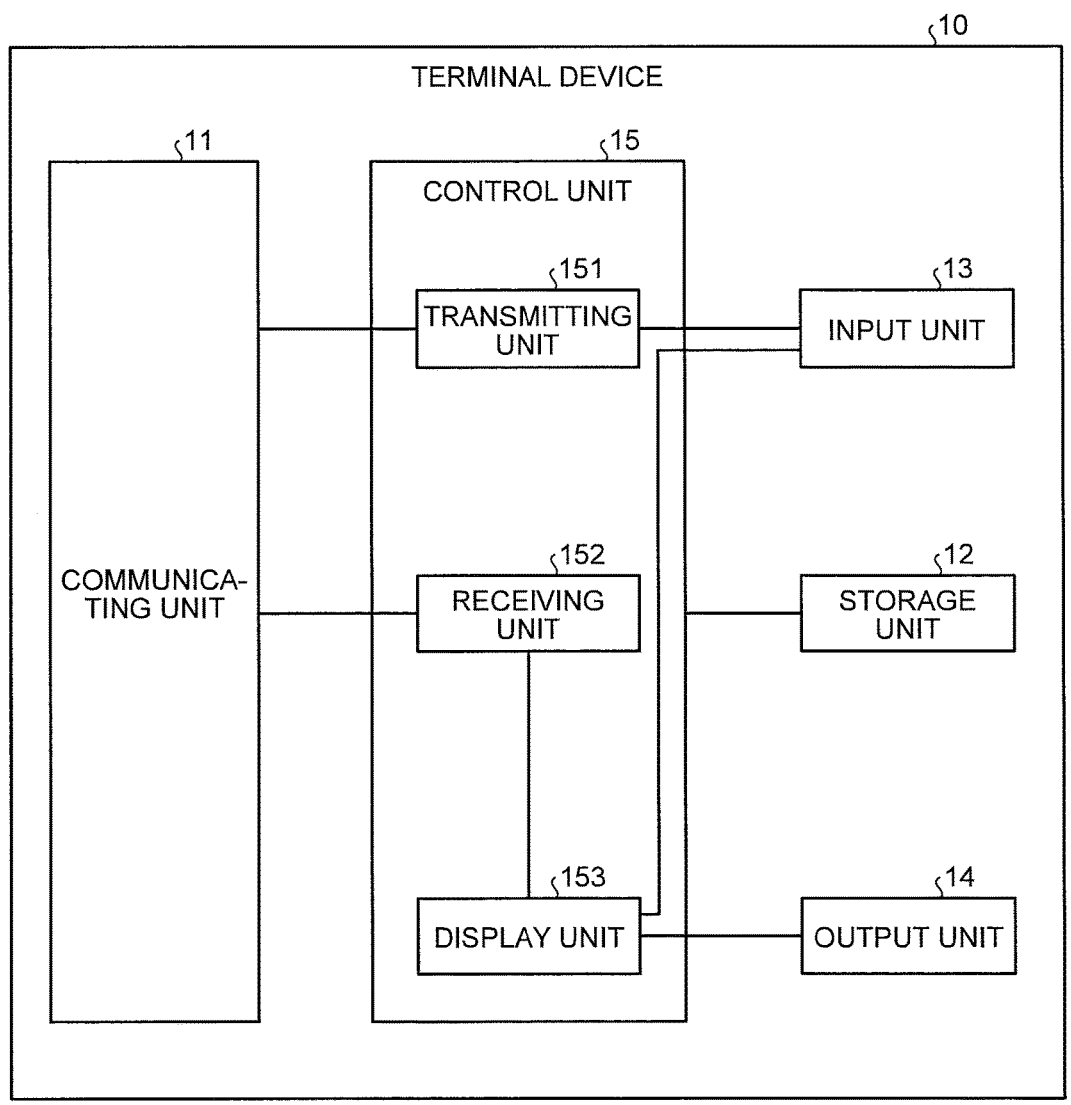
FIG. 6 is a schematic illustrating an exemplary configuration of a terminal device according to the embodiment.

A configuration of the terminal device 10 according to the present embodiment will now be explained with reference to FIG. 6. FIG. 6 is a schematic illustrating an exemplary configuration of the terminal device 10 according to the present embodiment. As illustrated in FIG. 6, the terminal device 10 includes a communicating unit 11, a storage unit 12, an input unit 13, an output unit 14, and a control unit 15.

Communicating Unit 11

The communicating unit 11 is implemented as a communication circuit, for example. The communicating unit 11 is connected to some communication network, not illustrated, over the wire or wirelessly, and exchanges information with the advertisement delivery apparatus 100.

Storage Unit 12

The storage unit 12 is implemented as a storage device such as a RAM, a semiconductor memory device such as a flash memory, a hard disk, or an optical disk, for example. The storage unit 12 stores therein, for example, information related to applications installed on the terminal device 10, e.g., computer programs.

Input Unit 13

The input unit 13 receives various operations from a user. For example, the input unit 13 may receive various operations from a user via a display surface (such as the output unit 14 or a display unit 153) using a touch panel function. The input unit 13 may also receive various operations from a button provided to the terminal device 10, or a keyboard or a mouse connected to the terminal device 10.

Output Unit 14

The output unit 14 is a display screen of a tablet terminal or the like, implemented as a liquid crystal display or an organic electro-luminescence (EL) display, for example, and is a display device for displaying various types of information.

Control Unit 15

The control unit 15 is implemented by causing a CPU, an MPU, or the like to execute various computer programs stored in a storage device, e.g., the storage unit 12, that is internal to the terminal device 10, using a RAM as a working area. For example, these various computer programs include computer programs of the installed applications. The control unit 15 may also be implemented as an integrated circuit such as an ASIC or an FPGA.

As illustrated in FIG. 6, the control unit 15 includes a transmitting unit 151, a receiving unit 152, and a display unit 153, and implements or executes the functions or the actions of the delivery process explained below. The internal configuration of the control unit 15 is not limited to that illustrated in FIG. 6, and may have any other configuration as long as the configuration is enabled to perform the delivery process explained below. The processing units provided to the control unit 15 may be connected in any way, without limitation to the configuration illustrated in FIG. 6.

The transmitting unit 151 transmits various types of information to external apparatuses. For example, the transmitting unit 151 transmits a request for content to the content delivery apparatus 50, in accordance with a user operation received by the input unit 13. For example, the transmitting unit 151 transmits a request for content received from an application such as a browser, which has been started, to the content delivery apparatus 50. When the content delivery apparatus 50 received by the receiving unit 153 includes a section for presenting an advertisement, the transmitting unit 151 transmits a delivery request for the advertisement to the advertisement delivery apparatus 100. For example, the transmitting unit 151 transmits information for identifying the user who is using the terminal device 10 to the advertisement delivery apparatus 100 as a delivery request for an advertisement.

The receiving unit 152 receives various types of information from external apparatuses. For example, the receiving unit 152 receives content delivered by the content delivery apparatus 50. In the example illustrated in FIG. 1, the receiving unit 152 receives the content CT10 including the advertisement presenting section AR11 from the content delivery apparatus 50. The receiving unit 152 also receives the advertisement delivered by the advertisement delivery apparatus 100. For example, the receiving unit 152 receives text information that is a text of the advertisement, and the user information that is related to the user who is using the terminal device 10 and that is to be added to the advertisement. For example, the receiving unit 152 receives the content including the image information, and the user information that is text information that is to be presented in a manner superimposed over the image information. The receiving unit 152 also receives the content including the image information over which the user information is to be superimposed, and the information to be presented in the section where no such user information is to be added. In the example illustrated in FIG. 1, the receiving unit 152 receives the text information AC11, the image G12, and the user information UI11, as an advertisement, from the advertisement delivery apparatus 100. The receiving unit 152 may also receive the control information instructing how the user information is to be presented.

The display unit 153 presents the content and the advertisement received by the receiving unit 152. For example, the display unit 153 adds the user information to the content received by the receiving unit 152, and presents the content. The display unit 153 adds the user information to the advertisement received by the receiving unit 152, and presents the advertisement. The display unit 153 presents the user information in a manner superimposed over the image information. The display unit 153 presents the user information in a manner superimposed over the image information, and another piece of information to be presented in the section where no such user information is to be added. The display unit 153 presents the content including the image information with the user information superimposed as a list together with another piece of content. The display unit 153 may present the user information in accordance with the control information received by the receiving unit 152 and instructing how the user information is to be presented.

In the example illustrated in FIG. 1, the display unit 153 presents the image G12 with the user information UI11 superimposed, and the text information AC11 presented in the section where no user information UI11 is added. In the example illustrated in FIG. 1, the display unit 153 presents the advertisement including the image G12 with the user information UI11 superimposed, as a list together with the other pieces of content CT11 to CT13.

The process such as the presenting process performed by the control unit 15 may be implemented using JavaScript (registered trademark), for example. When the presenting process described above is executed by a predetermined application or when the presenting process is executed by a dedicated application, the control unit 15 may include an application control unit for controlling the predetermined application or the dedicated application, for example.

4. Sequence of Delivery Process

Steps included in the delivery process performed by the delivery system 1 according to the present embodiment will now be explained with reference to FIG. 7. FIG. 7 is a flowchart illustrating an example of the delivery process according to the present embodiment.

As illustrated in FIG. 7, the receiving unit 131 in the advertisement delivery apparatus 100 receives a delivery request for an advertisement (Step S101). For example, the receiving unit 131 receives a delivery request for an advertisement from the terminal device 10. The selecting unit 132 in the advertisement delivery apparatus 100 then selects text information that is a text of the advertisement from the advertisement information storage unit 121 (Step S102). The selecting unit 132 then selects image information from the image information storage unit 123 based on the text information selected at Step S102 (Step S103). The selecting unit 132 also selects a user attribute from the user attribute information storage unit 122, based on the image information selected at Step S103 and the text information selected at Step S102 (Step S104).

The generating unit 133 in the advertisement delivery apparatus 100 then generates user information based on the user attribute selected at Step S104 (Step S105). The delivering unit 134 in the advertisement delivery apparatus 100 then delivers the text information selected at Step S102, the image information selected at Step S103, and the user information generated at Step S104 to the terminal device 10 (Step S106).

5. Sequence of Presenting Process

Steps included in the presenting process in the terminal device 10 according to the present embodiment will now be explained with reference to FIG. 8. FIG. 8 is a flowchart illustrating an example of a presenting process in the terminal device according to the present embodiment.

As illustrated in FIG. 8, the receiving unit 152 in the terminal device 10 receives the advertisement including the text information, the user information, and the image information (Step S201). The display unit 153 in the terminal device 10 then superimposes the user information over the image information (Step S202). The display unit 153 then presents the image information with the user information superimposed, and the text information in a predetermined layout (Step S203).

6. Modifications

Because the delivery system 1 according to the present embodiment may be implemented in various configurations other than that described in the above embodiment, other embodiments of the delivery system 1 will now be explained.

6-1. Priority-Based User Attribute Selection

The advertisement delivery apparatus 100 may select the attribute based on the priorities assigned to the respective attributes. This point will now be explained with reference to FIGS. 9 and 10. FIG. 9 is a schematic illustrating an example of an advertisement information storage unit according to this modification. FIG. 10 is a flowchart illustrating an example of a delivery process according to the modification. In the example illustrated in FIGS. 9 and 10, because the only difference is that attribute-related priorities are added to the information stored in the advertisement information storage unit in the advertisement delivery apparatus, only the advertisement information storage unit will be referred to as an advertisement information storage unit 221, and the other parts will be assigned with the same reference numerals, and their explanations will be omitted.

Advertisement Information Storage Unit 221

The advertisement information storage unit 221 according to the modification stores therein various types of information related to advertisements. FIG. 10 illustrates an example of the advertisement information storage unit 221 according to the modification. The advertisement information storage unit 221 illustrated in FIG. 10 include items such as "advertisement ID", "text information", "advertiser ID", "product", and "priority".

The "priority" represents the priority at which the user attribute is prioritized for the corresponding advertisement. For example, in the example illustrated in FIG. 10, the advertisement identified by the advertisement ID "AC11" represents that the age being "30s" has a first priority, and the sex being "male" has a second priority. The priorities may be determined based on various types of information depending on the purpose. For example, the priorities may be determined based on evaluations of the advertisements (e.g., predicted revenues). The advertisement evaluation may also be expressed as an effective cost per mille (eCPM).

6-1-1. Sequence of Delivery Process

Steps included in the delivery process based on the priorities of the user attributes will now be explained with reference to FIG. 10. FIG. 10 is a flowchart illustrating an example of the delivery process according to the modification.

As illustrated in FIG. 10, the receiving unit 131 in the advertisement delivery apparatus 100 receives a delivery request for an advertisement (Step S301). For example, the receiving unit 131 receives a delivery request for an advertisement from the terminal device 10. The selecting unit 132 in the advertisement delivery apparatus 100 then selects text information that is a text of the advertisement from the advertisement information storage unit 121 (Step S302). The selecting unit 132 also selects image information from the image information storage unit 123 based on the text information selected at Step S302 (Step S303).

The selecting unit 132 then selects the user attribute with the highest priority, among those not having been selected yet (Step S304). For example, when the text information of the advertisement identified by the advertisement ID "AC11" is selected at Step S302, and if the age of the user to whom the advertisement is to be delivered is in his/her 30s, the selecting unit 132 selects the age "30s" having the first priority, as a user attribute. If the age of the user to whom the advertisement is delivered is not in his/her 30s, the selecting unit 132 may not select the age "30s", having the first priority, as a user attribute. If a predetermined number of user attributes have not been selected yet (No at Step S305), the selecting unit 132 shifts the process back to Step S304, and selects the user attribute with the highest priority, among those not having been selected yet (Step S304).

If the predetermined number of user attributes has been selected (Yes at Step S305), the selecting unit 132 generates user information based on the selected user attributes (Step S306). The delivering unit 134 in the advertisement delivery apparatus 100 then delivers the text information selected at Step S302, the image information selected at Step S303, and the user information generated at Step S306 to the terminal device 10 (Step S307). The priorities described in the example are merely exemplary, and the priorities may also be determined based on evaluations corresponding to the respective advertisements or users, without limitation to statistical evaluations of the entire advertisements. In such a case, the selecting unit 132 may select a user attribute based on evaluations corresponding to each user, for example. For example, the selecting unit 132 may prioritize and select the user attribute "sex" when the particular user has a high evaluation of the user attribute "sex".

6-2. Event-Dependent User Information

Figure 11:
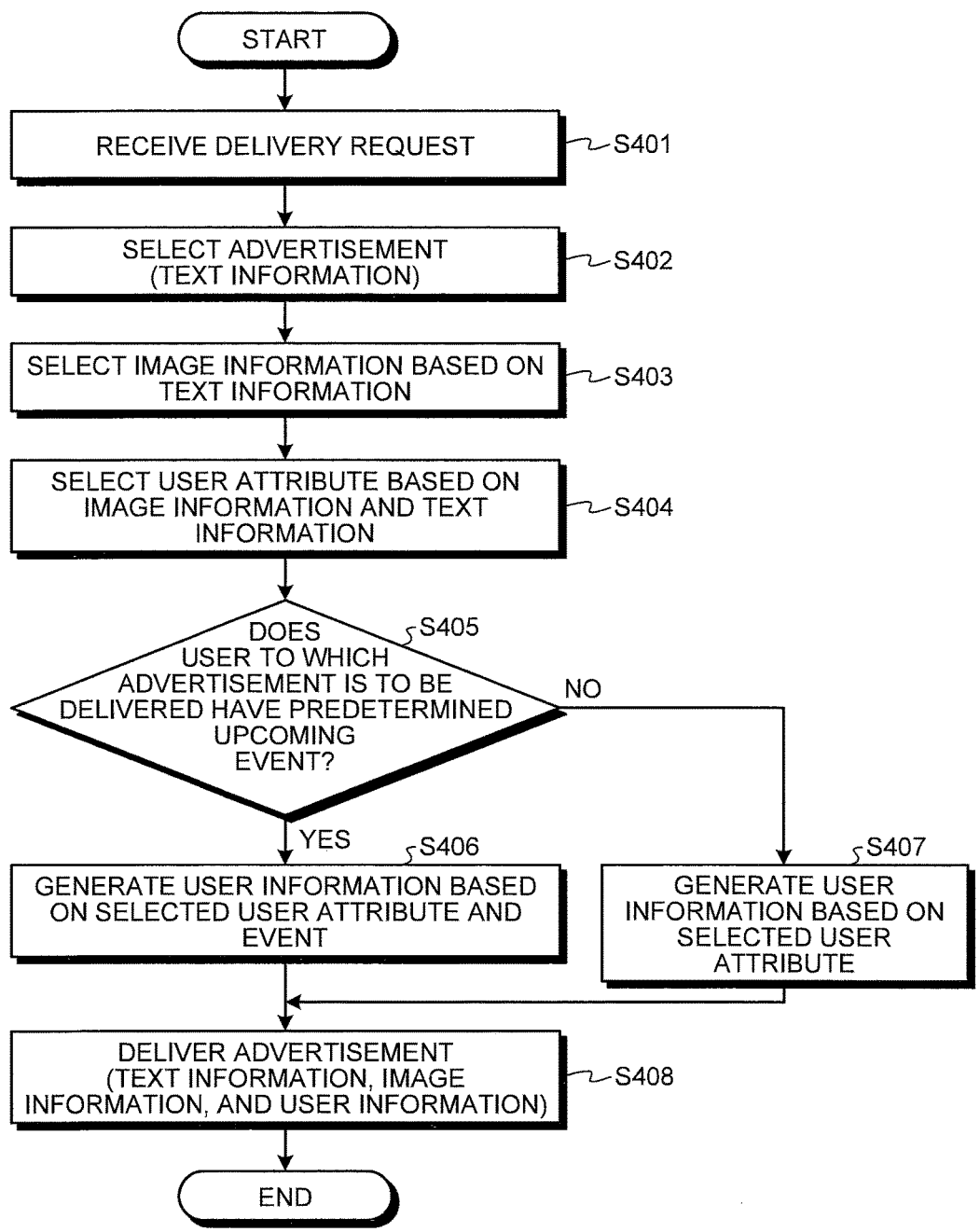
FIG. 11 is a flowchart illustrating an example of a delivery process according to another modification.

The advertisement delivery apparatus 100 may generate the user information based on whether the user to which the advertisement is to be delivered has some upcoming event. This point will now be explained with reference to FIG. 11. Steps included in the delivery process based on whether the user has some upcoming event will now be explained with reference to FIG. 11. FIG. 11 is a flowchart illustrating an example of a delivery process according to this modification.

As illustrated in FIG. 11, the receiving unit 131 in the advertisement delivery apparatus 100 receives a delivery request for an advertisement (Step S401). For example, the receiving unit 131 receives a delivery request for an advertisement from the terminal device 10. The selecting unit 132 in the advertisement delivery apparatus 100 then selects text information that is a text of the advertisement from the advertisement information storage unit 121 (Step S402). The selecting unit 132 also selects image information from the image information storage unit 123 based on the text information selected at Step S402 (Step S403). The selecting unit 132 also selects a user attribute from the user attribute information storage unit 122 based on the image information selected at Step S403 and the text information selected at Step S402 (Step S404).

The generating unit 133 determines whether the user to whom the advertisement is to be delivered has a predetermined upcoming event (Step S405). For example, the generating unit 133 determines whether the user to whom the advertisement is to be delivered has a predetermined upcoming event based on the time and the date at which the delivery request is received by the receiving unit 131, the user-related information received by the receiving unit 131, and the information related to the user attributes stored in the user attribute information storage unit 122. For example, if the user to whom the advertisement is to be delivered has searched for a wedding hall, the generating unit 133 may determine that the user has a predetermined upcoming event (wedding). As another example, if the user to whom the advertisement is to be delivered has purchased a book about naming a baby, the generating unit 133 may determine that the user has another predetermined event (child birth). As another example, if the user to whom the advertisement is to be delivered has browsed through some auction or shopping sites looking for a certain product, the generating unit 133 may determine that the user has another predetermined upcoming event (purchase of the certain product). In this manner, the predetermined event herein may be any event taking place in one's life, and various events may be selected as appropriate, depending on the user attributes.

If the user to whom the advertisement is to be delivered is determined to have a predetermined upcoming event (Yes at Step S405), the generating unit 133 generates user information based on the selected user attribute and the event (Step S406). If the user to whom the advertisement is to be delivered is determined to have the predetermined upcoming event (wedding), for example, the generating unit 133 may generate user information including information recommending reservation of a wedding hall. If the user to whom the advertisement is to be delivered is determined to have the predetermined upcoming event (child birth), the generating unit 133 may generate user information including information recommending purchase of a product or use of a service related to a child, as another example. If the user to whom the advertisement is to be delivered is determined to have the predetermined upcoming event (purchase of a certain product), the generating unit 133 may generate the user information including information prompting the user to purchase the certain product, as another example.

If the user to whom the advertisement is to be delivered is determined to not have any predetermined upcoming event (No at Step S405), the selecting unit 132 generates user information based on the selected user attributes (Step S407). The delivering unit 134 in the advertisement delivery apparatus 100 then delivers the text information selected at Step S402, the image information selected at Step S403, and the generated user information to the terminal device 10 (Step S408).

6-3. User Information in Other Types of Content

Explained in the embodiment and the modifications above is an example in which user information is added to an advertisement including image information. The user information, however, may be added to various types of information depending on the purpose. For example, the user information may be added to video information or audio information. In such a case, the advertisement delivery apparatus 100 delivers content including video information or audio information, and user information that is audio information to be added to the content to the terminal device 10, for example. The terminal device 10 may also present the user information as text information at a position near where the video information is presented. This point will now be explained with reference to FIG. 12.

Figure 12:
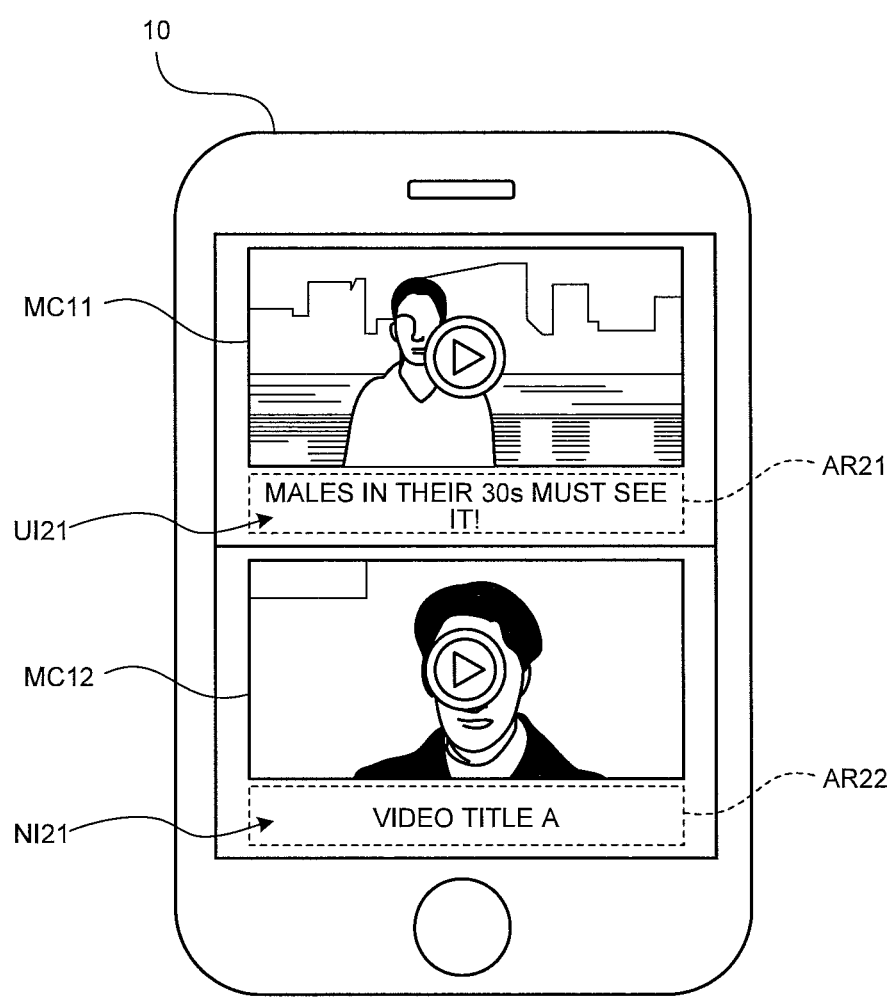
FIG. 12 is a schematic illustrating an example how the user information is presented on the terminal device.

FIG. 12 is a schematic illustrating an example how the user information is presented on the terminal device. In the example illustrated in FIG. 12, a thumbnail MC11 and a thumbnail MC12 of two respective videos are presented on the terminal device 10. For example, the terminal device 10 receives the video information corresponding to the thumbnail MC11 as well as the user information, and presents the user information in a presenting section AR21 that is positioned below the thumbnail MC11. In the example illustrated in FIG. 12, "Males in their 30s must see it!" that is the user information UI21 is presented in the presenting section AR21. The terminal device 10 may output "Males in their 30s must see it!" that is the user information UI21 as an audio, for example, after the user makes an operation for replaying the video information corresponding to the thumbnail MC11, and before the video is started. In this example, the terminal device 10 outputs the audio from an audio output unit such as a speaker. Because the terminal device 10 has not received any user information with the video information corresponding to the thumbnail MC12, a "video title A" that is information NI21 is generally presented in the presenting section AR22 that is positioned below the thumbnail MC12. The terminal device 10 may present the user information in a manner superimposed over the video information, as a floating banner, for example.

7. Advantageous Effects

As described above, the advertisement delivery apparatus 100 according to the present embodiment includes the receiving unit 131 and the delivering unit 134. The receiving unit 131 receives a delivery request for content from the terminal device. The delivering unit 134 delivers the content corresponding to the delivery request, and user information that is related to a user who is using the terminal device 10 and that is to be added to the content to the terminal device 10.

In this manner, with the advertisement delivery apparatus 100 according to the present embodiment, the chances of the user being attracted to the content can be increased, because the content presented to the user who is using the terminal device 10 is content added with user information that is related to the user him/herself. In other words, the advertisement delivery apparatus 100 can achieve a selective attention, that is, what is called a cocktail party effect, in the human behavioral psychology, in the delivery of content such as an advertisement. In this manner, the advertisement delivery apparatus 100 is enabled to deliver advertisements suitable for each user.

In the advertisement delivery apparatus 100 according to the present embodiment, the delivering unit 134 delivers the user information corresponding to an attribute selected from attributes related to the user, based on a correlation with the content to the terminal device 10.

Therefore, with the advertisement delivery apparatus 100 according to the present embodiment, the chances of the user being attracted to the content can be increased, because the content presented to the user who is using the terminal device 10 is content added with user information having been generated based on the attribute of the user himself/herself. In this manner, the advertisement delivery apparatus 100 is enabled to deliver advertisements suitable for each user.

Furthermore, in the advertisement delivery apparatus 100 according to the present embodiment, the delivering unit 134 delivers the user information corresponding to an attribute selected from attributes related to the user, based on the priorities assigned to the respective attributes to the terminal device 10.

In this manner, with the advertisement delivery apparatus 100 according to the present embodiment, the chances of the user being attracted to the content can be increased, because the content presented to the user who is using the terminal device 10 is content added with user information having been generated based on the attribute of the user him/herself with a high priority. In this manner, the advertisement delivery apparatus 100 is enabled to deliver advertisements suitable for each user.

Furthermore, in the advertisement delivery apparatus 100 according to the present embodiment, the delivering unit 134 delivers the content including the image information, and the user information that is text information that is to be presented in a manner superimposed over the image information to the terminal device 10.

In this manner, with the advertisement delivery apparatus 100 according to the present embodiment, the chances of the user being attracted to the content can be increased, because the content is presented with the user information, which has been generated based on the attribute of the user him/herself, superimposed over the image. In this manner, the advertisement delivery apparatus 100 is enabled to deliver advertisements suitable for each user.

Furthermore, in the advertisement delivery apparatus 100 according to the present embodiment, the delivering unit 134 delivers content including image information over which the user information is to be presented in a superimposed manner, and information to be presented in a section where no such user information is to be added, to the terminal device 10.

In this manner, with the advertisement delivery apparatus 100 according to the present embodiment, the chances of the user being attracted to the content can be increased, because the content includes an image over which user information is to be superimposed, and text information that is to be presented in a section where no such user information is to be added. In this manner, the advertisement delivery apparatus 100 is enabled to deliver advertisements suitable for each user.

Furthermore, in the advertisement delivery apparatus 100 according to the present embodiment, the delivering unit 134 delivers the content to the terminal device 10 that presents the content including the image information over which the user information is presented in a superimposed manner, as a list together with another piece of content.

In this manner, with the advertisement delivery apparatus 100 according to the present embodiment, because the content including the image over which the user information is superimposed, with the user information having been generated based on the attribute of the user him/herself, is presented as a list with another piece of content, the chances of the user being attracted to the content added with the user information related to the user him/herself, but not to the other content, can be increased. In this manner, the advertisement delivery apparatus 100 is enabled to deliver advertisements suitable for each user.

Furthermore, in the advertisement delivery apparatus 100 according to the present embodiment, the delivering unit 134 delivers content including video information or audio information, and the user information that is audio information to be added to the content to the terminal device 10.

In this manner, with the advertisement delivery apparatus 100 according to the present embodiment, the chances of the user being attracted to the content can be increased, because the content to be replayed is added with the user information having been generated based on the attribute of the user who is using the terminal device 10 himself/herself. In this manner, the advertisement delivery apparatus 100 is enabled to deliver advertisements suitable for each user.

In the advertisement delivery apparatus 100 according to the present embodiment, the receiving unit 131 receives a delivery request for an advertisement that is content from the terminal device 10. The delivering unit 134 delivers the advertisement corresponding to the delivery request, and user information that is related to the user who is using the terminal device-10 and that is to be added to the advertisement to the terminal device 10.

In this manner, with the advertisement delivery apparatus 100 according to the present embodiment, because the presented advertisement is added with user information having been generated based on the attribute of the user him/herself using the terminal device 10, the chances of the user being attracted to the advertisement can be further increased. In this manner, the advertisement delivery apparatus 100 is enabled to deliver advertisements suitable for each user. In other words, the advertisement delivery apparatus 100 can deliver suitable content depending on users.

Furthermore, the terminal device 10 according to the present embodiment includes the receiving unit 152 and the display unit 153. The receiving unit 152 receives content, and user information that is related to a user who is using the terminal device 10 and that is to be added to the content. The display unit 153 adds the user information to the content received by the receiving unit 152, and presents the content.

In this manner, with the terminal device 10 according to the present embodiment, the chances of the user being attracted to the content can be increased, because the content presented to the user who is using the terminal device 10 is added with the user information having been generated based on the attribute of the user himself/herself. In this manner, the terminal device 10 can present suitable content depending on users.

In the terminal device 10 according to the present embodiment, the receiving unit 152 receives the content including the image information, and the user information that is text information that is to be presented in a manner superimposed over the image information. The display unit 153 presents the user information in a manner superimposed over the image information.

In this manner, with the terminal device 10 according to the present embodiment, the chances of the user being attracted to the content can be increased, because presented is content including an image presented with the user information having been generated based on the attribute of the user him/herself superimposed. In this manner, the terminal device 10 can present suitable content depending on users.

Furthermore, in the terminal device 10 according to the present embodiment, the receiving unit 152 receives content including image information over which the user information is to be presented in a superimposed manner, and information to be presented in a section where no such user information is to be added. The display unit 153 then presents the image information with the user information superimposed, and the information to be presented in the section where no such user information is added.

In this manner, with the terminal device 10 according to the present embodiment, the chances of the user being attracted to the content can be increased, because the content includes an image with the user information superimposed, and text information presented in the section where no such user information is added. In this manner, the terminal device 10 can present suitable content depending on users.

Furthermore, in the terminal device 10 according to the present embodiment, the display unit 153 presents the content including the image information with the user information superimposed, as a list together with another piece of content.

In this manner, because the terminal device 10 according to the present embodiment presents content including an image that is presented with user information having been generated based on the attribute of the user him/herself in a manner superimposed over the image, as a list together with another piece of content, the user is more likely to be attracted to the content added with the user information that is related to the user him/herself, rather than being attracted to the other content. In this manner, the terminal device 10 can present suitable content depending on users.

Furthermore, in the terminal device 10 according to the present embodiment, the receiving unit 152 receives an advertisement and the user information, and the display unit 153 adds the user information to the advertisement received by the receiving unit 152, and presents the advertisement.

Therefore, because the advertisement presented on the terminal device 10 according to the present embodiment is an advertisement added with the user information having been generated based on the attribute of the user him/herself who is the user using the terminal device 10, the chances of the user being attracted to the advertisement can be further increased. In this manner, the terminal device 10 can present advertisements suitable for each user. In other words, the terminal device 10 can present suitable content depending on users.

8. Hardware Structure

Figure 13:
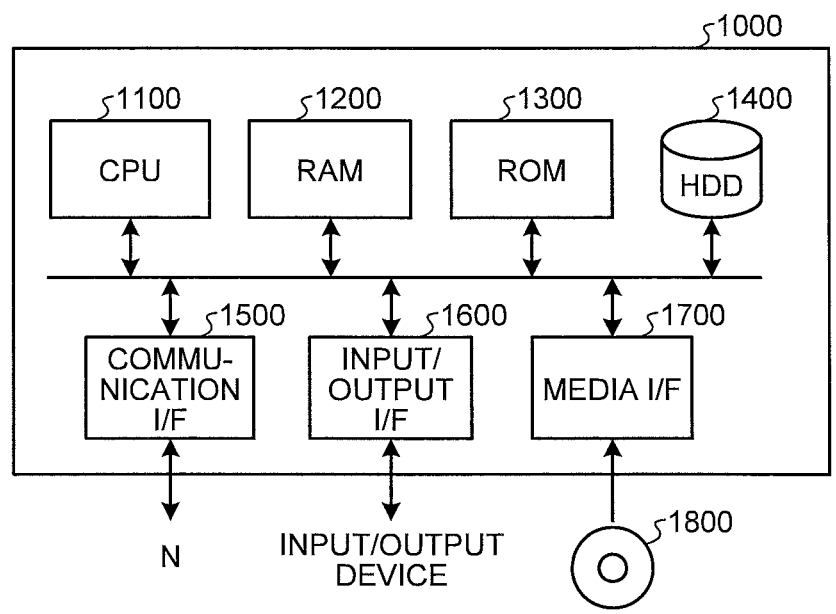
FIG. 13 is a schematic illustrating an example of a hardware configuration of a computer implementing the functions of the advertisement delivery apparatus.

The advertisement delivery apparatus 100 according to the present embodiment is achieved by a computer 1000 having the structure illustrated in FIG. 13, for example. FIG. 13 is a hardware structural diagram illustrating an example of the computer that achieves the functions of the advertisement delivery apparatus 100. The computer 1000 includes a CPU 1100, a RAM 1200, a read-only memory (ROM) 1300, a hard disk drive (HDD) 1400, a communication interface (I/F) 1500, an input-output interface (I/F) 1600, and a media interface (I/F) 1700.

The CPU 1100 operates on the basis of a computer program stored in the ROM 1300 or the HDD 1400 and controls the respective components. The ROM 1300 stores therein a boot program executed by the CPU 1100 when the computer 1000 is booted and computer programs dependent on the hardware of the computer 1000, for example.

The HDD 1400 stores therein computer programs executed by the CPU 1100 and data used by the computer programs, for example. The communication interface 1500 receives data from another apparatus via a network N and sends the data to the CPU 1100. The communication interface 1500 transmits data produced by the CPU 1100 to another apparatus via the network N.

The CPU 1100 controls output devices such as a display and a printer and input devices such as a keyboard and a mouse via the input-output I/F 1600. The CPU 1100 acquires data from the input devices via the input-output I/F 1600. The CPU 1100 outputs produced data to the output devices via the input-output I/F 1600.

The media I/F 1700 reads a computer program or data stored in a recording medium 1800 and provides the data to the CPU 1100 via the RAM 1200. The CPU 1100 loads the computer program in the RAM 1200 from the recording medium 1800 via the media I/F 1700 and executes the loaded computer program. The recording medium 1800 is an optical recording medium such as a digital versatile disc (DVD) or a phase change rewritable disc (PD), a magneto-optical recording medium such as a magneto-optical disc (MO), a tape medium, a magnetic recording medium, or a semiconductor memory.

For example, when the computer 1000 functions as the advertisement delivery apparatus 100 according to the present embodiment, the CPU 1100 of the computer 1000 executes the computer program loaded in the RAM 1200 to achieve the functions of the control unit 130. The CPU 1100 of the computer 1000, which reads the computer programs from the recording medium 1800 and executes them, may acquire the computer programs from another device via the network N.

Some embodiments and modifications of the present invention are explained above in detail, but these embodiments and modifications are provided by way of example only, and the present invention may be implemented in any other embodiments with various modifications and improvements applied, based on the knowledge of those skilled in the art, in addition to the embodiment disclosed herein.

9. Others

In the processes described in the embodiments and modifications, all or a part of the processes described to be automatically performed can also be manually performed. Alternatively, all or a part of the processes described to be manually performed can also be automatically performed by known methods. In addition, the processing procedures, the specific names, and information including various types of data and parameters described in the above description and drawings can be changed as required unless otherwise specified. For example, the various types of information illustrated in the respective drawings are not limited to them.

Furthermore, the components of the devices illustrated in the drawings are functionally conceptual, and are not always required to be physically configured as illustrated in the drawings. That is, specific forms of distribution and integration of the devices are not limited to those illustrated in the drawings. All or a part of the devices can be configured to be functionally or physically distributed or integrated in any desired units in accordance with various loads, the usage states, and the like.

The embodiments and modifications described above can be combined as appropriate without inconsistency among them.

The term "unit" described above can be replaced with a "section", a "module", or a "circuit", for example. For example, the receiving unit can be replaced with a receiving section or a receiving circuit.

According to one aspect of an embodiment, suitable content can be delivered depending on users, advantageously.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A delivery apparatus comprising:
    a memory storing:
        content data including a plurality of pieces of digital content for delivery to terminal devices; and
        user data including an attribute about each of a plurality of users of the terminal devices;
    a network interface; and
    a processor operatively connected to the memory and network interface, the processor being programmed to:
        receive, via the network interface:
            a first delivery request for digital content from a terminal device of a user; and
            data identifying the user of the terminal device;
        in response to the delivery request, access a first piece of digital content from the memory;
        in response to the received data identifying the user:
            predict an attribute about the user of the terminal device; and
            prepare first modifying content for modifying the accessed piece of digital content to target the predicted attribute; and deliver the accessed first piece of digital content and the prepared first modifying content to the terminal device of the user via the network interface;
receive an indication from the terminal device that the user of the terminal device interacted with the first piece of digital content modified by the prepared first modifying content;
based on the received indication, create user data about the user by storing the predicted attribute about the user in the memory as an attribute about the user;
receive, via the network interface:
  a second delivery request for digital content from the terminal device of the user; and
  data identifying the user of the terminal device;
in response to the second delivery request, access a second piece of digital content from the memory;
in response to the received data identifying the user:
  access the stored attribute about the user of the terminal device from the memory; and
  prepare second modifying content for modifying the accessed second piece of digital content to target the accessed attribute; and
deliver the accessed second piece of digital content and the prepared second modifying content to the terminal device of the user via the network interface.

2. The delivery apparatus according to claim 1, wherein the second piece of digital content includes image information and the second modifying content is text information that is to be presented in a manner superimposed over the image information.

3. The delivery apparatus according to claim 2, wherein the second piece of digital content includes an area over which the text information is to be presented in a superimposed manner, and an area where no text information is to be superimposed.

4. The delivery apparatus according to claim 2, wherein the second piece of digital content delivered to the terminal device is formatted so that it can be displayed in a list together with another piece of digital content on the terminal device.

5. The delivery apparatus according to claim 1, wherein the second piece of digital content includes video information or audio information, and the second modifying content is audio information to be added to the second piece of digital content.

6. The delivery apparatus according to claim 1, wherein the second delivery request is a request for an advertisement.

7. A delivery method executed by a computer, the delivery method comprising:
receiving, via a network interface:
  a first delivery request for digital content from a terminal device of a user; and
  data identifying the user of the terminal device;
in response to the delivery request, accessing a first piece of digital content from a memory;
in response to the received data identifying the user:
  predicting an attribute about the user of the terminal device; and
  preparing first modifying content for modifying the accessed piece of digital content to target the predicted attribute; and
delivering the accessed first piece of digital content and the prepared first modifying content to the terminal device of the user via the network interface;
receiving an indication from the terminal device that the user of the terminal device interacted with the first piece of digital content modified by the prepared first modifying content;
based on the received indication, creating user data about the user by storing the predicted attribute about the user in the memory as an attribute about the user;
receiving, via the network interface:
  a second delivery request for digital content from the terminal device of the user; and
  data identifying the user of the terminal device;
in response to the second delivery request, accessing a second piece of digital content from the memory;
in response to the received data identifying the user:
  accessing the stored attribute about the user of the terminal device from the memory; and
  preparing second modifying content for modifying the accessed second piece of digital content to target the accessed attribute; and
delivering the accessed second piece of digital content and the prepared second modifying content to the terminal device of the user via the network interface.

8. A non-transitory computer-readable storage medium having stored therein a delivery program causing a computer to execute:
receiving, via a network interface:
  a first delivery request for digital content from a terminal device of a user; and
  data identifying the user of the terminal device;
in response to the delivery request, accessing a first piece of digital content from a memory;
in response to the received data identifying the user:
  predicting an attribute about the user of the terminal device; and
  preparing first modifying content for modifying the accessed piece of digital content to target the predicted attribute; and
delivering the accessed first piece of digital content and the prepared first modifying content to the terminal device of the user via the network interface;
receiving an indication from the terminal device that the user of the terminal device interacted with the first piece of digital content modified by the prepared first modifying content;
based on the received indication, creating user data about the user by storing the predicted attribute about the user in the memory as an attribute about the user;
receiving, via the network interface:
  a second delivery request for digital content from the terminal device of the user; and
  data identifying the user of the terminal device;
in response to the second delivery request, accessing a second piece of digital content from the memory;
in response to the received data identifying the user:
  accessing the stored attribute about the user of the terminal device from the memory; and
  preparing second modifying content for modifying the accessed second piece of digital content to target the accessed attribute; and
delivering the accessed second piece of digital content and the prepared second modifying content to the terminal device of the user via the network interface.

* * * * *